United States Patent
Louie et al.

(10) Patent No.: US 11,911,977 B2
(45) Date of Patent: Feb. 27, 2024

(54) MACHINE CONFIGURED TO FORM A COMPOSITE STRUCTURE

(71) Applicant: The Boeing Company, Chicago, IL (US)

(72) Inventors: Michael Kenneth-Que Louie, Renton, WA (US); Robert Graham Albers, Bellevue, WA (US); Jeron D. Moore, Lynnwood, WA (US); Luis A. Perla, Sammamish, WA (US); Gagandeep Saini, Snohomish, WA (US); Brice A. Johnson, Federal Way, WA (US); Marcin A. Rabiega, Everett, WA (US)

(73) Assignee: The Boeing Company, Chicago, IL (US)

( * ) Notice: Subject to any disclaimer, the term of this patent is extended or adjusted under 35 U.S.C. 154(b) by 357 days.

(21) Appl. No.: 17/313,074

(22) Filed: May 6, 2021

(65) Prior Publication Data

US 2021/0252807 A1    Aug. 19, 2021

Related U.S. Application Data

(62) Division of application No. 15/977,981, filed on May 11, 2018, now Pat. No. 11,020,913.

(51) Int. Cl.
*B29C 70/38* (2006.01)
*G05B 19/18* (2006.01)
(Continued)

(52) U.S. Cl.
CPC ............ *B29C 70/38* (2013.01); *B29C 70/388* (2013.01); *B29C 70/54* (2013.01); *B32B 41/00* (2013.01);
(Continued)

(58) Field of Classification Search
CPC ................ B29C 70/386; B29C 70/388; B29K 2105/0872; B29K 2105/0881;
(Continued)

(56) References Cited

U.S. PATENT DOCUMENTS

| | | | | |
|---|---|---|---|---|
| 7,039,485 B2* | 5/2006 | Engelbart | ............. | B29C 70/386 156/379 |
| 7,835,567 B2* | 11/2010 | Oldani | .................. | B29C 70/382 382/152 |

(Continued)

FOREIGN PATENT DOCUMENTS

| | | |
|---|---|---|
| CN | 102294874 B | 12/2011 |
| EP | 2181835 A2 | 5/2010 |

(Continued)

OTHER PUBLICATIONS

Extended European Search Report, dated Aug. 23, 2019, regarding Application No. 19158145.3, 9 pages.

(Continued)

*Primary Examiner* — Atul P. Khare
(74) *Attorney, Agent, or Firm* — Yee & Associates, P.C.

(57) ABSTRACT

An illustrative example of the present disclosure provides a machine configured to form a composite structure. The machine includes a composite placement machine, measuring equipment, a tool path generator, and compaction equipment. The composite placement machine lays up composite plies. The measuring equipment measures surfaces of the composite plies to form measurements during layup of the composite plies. A computer includes a model of the composite plies for a structure. The tool path generator forms a modified tool path based upon a difference between the measurements and expected measurements for the composite plies in the model.

20 Claims, 11 Drawing Sheets

(51) Int. Cl.
*G05B 19/19* (2006.01)
*G05B 19/414* (2006.01)
*B29C 70/54* (2006.01)
*B32B 41/00* (2006.01)
*B29L 31/30* (2006.01)

(52) U.S. Cl.
CPC ........... *G05B 19/182* (2013.01); *G05B 19/19* (2013.01); *G05B 19/414* (2013.01); *B29L 2031/3076* (2013.01); *B32B 2041/04* (2013.01); *G05B 2219/45238* (2013.01)

(58) Field of Classification Search
CPC ....... B29K 2105/089; B29L 2031/3076; B29L 2031/3082; B29L 2031/3085; B29L 2031/3088; B32B 2305/10; B32B 2305/18; B32B 41/00; B32B 2041/04; G01N 2291/0231; G01N 2223/615; G01N 2021/8472; G05B 2219/45238
See application file for complete search history.

(56) References Cited

U.S. PATENT DOCUMENTS

| | | | |
|---|---|---|---|
| 8,522,614 B2 * | 9/2013 | May | B32B 41/00 73/866.5 |
| 8,695,669 B2 * | 4/2014 | Engelbart | B29C 70/384 156/367 |
| 9,649,813 B2 * | 5/2017 | Lacaze | B29C 70/681 |
| 9,675,990 B2 * | 6/2017 | Ellis | G01N 29/4472 |
| 9,694,546 B2 * | 7/2017 | Kisch | B29C 70/38 |
| 9,976,964 B2 * | 5/2018 | Fisset | G01N 23/083 |
| 10,953,609 B1 * | 3/2021 | Mark | B33Y 50/02 |
| 11,696,816 B2 * | 7/2023 | Gardner | G06T 19/20 345/419 |
| 2005/0163975 A1 | 7/2005 | Chen et al. | |
| 2009/0199948 A1 * | 8/2009 | Kisch | B29C 70/382 156/64 |
| 2015/0231835 A1 | 8/2015 | Pridie | |
| 2016/0325509 A1 * | 11/2016 | Prebil | B29C 70/386 |
| 2017/0057170 A1 * | 3/2017 | Gupta | G05B 19/4099 |
| 2017/0080453 A1 * | 3/2017 | Pringle, IV | B29C 70/00 |
| 2017/0228473 A1 | 8/2017 | Kang et al. | |

FOREIGN PATENT DOCUMENTS

| | | | |
|---|---|---|---|
| WO | WO 9736735 | 10/1997 | |
| WO | WO 2012141810 | 10/2012 | |
| WO | WO-2013138015 A1 * | 9/2013 | ............ B29C 70/38 |
| WO | 2014060747 A1 | 4/2014 | |
| WO | WO 2014132764 | 9/2014 | |
| WO | WO 2017006099 | 12/2017 | |

OTHER PUBLICATIONS

Japanese Office Action and English Translation, dated Jan. 19, 2023, regarding Application No. 2019-026432, 8 pages.
Chinese Office Action and English Translation, dated Jan. 19, 2022, regarding Application No. 2019103790419, 16 pages.
Chinese Office Action and English Translation, dated Apr. 22, 2022, regarding Application No. 2019103790419, 9 pages.

* cited by examiner

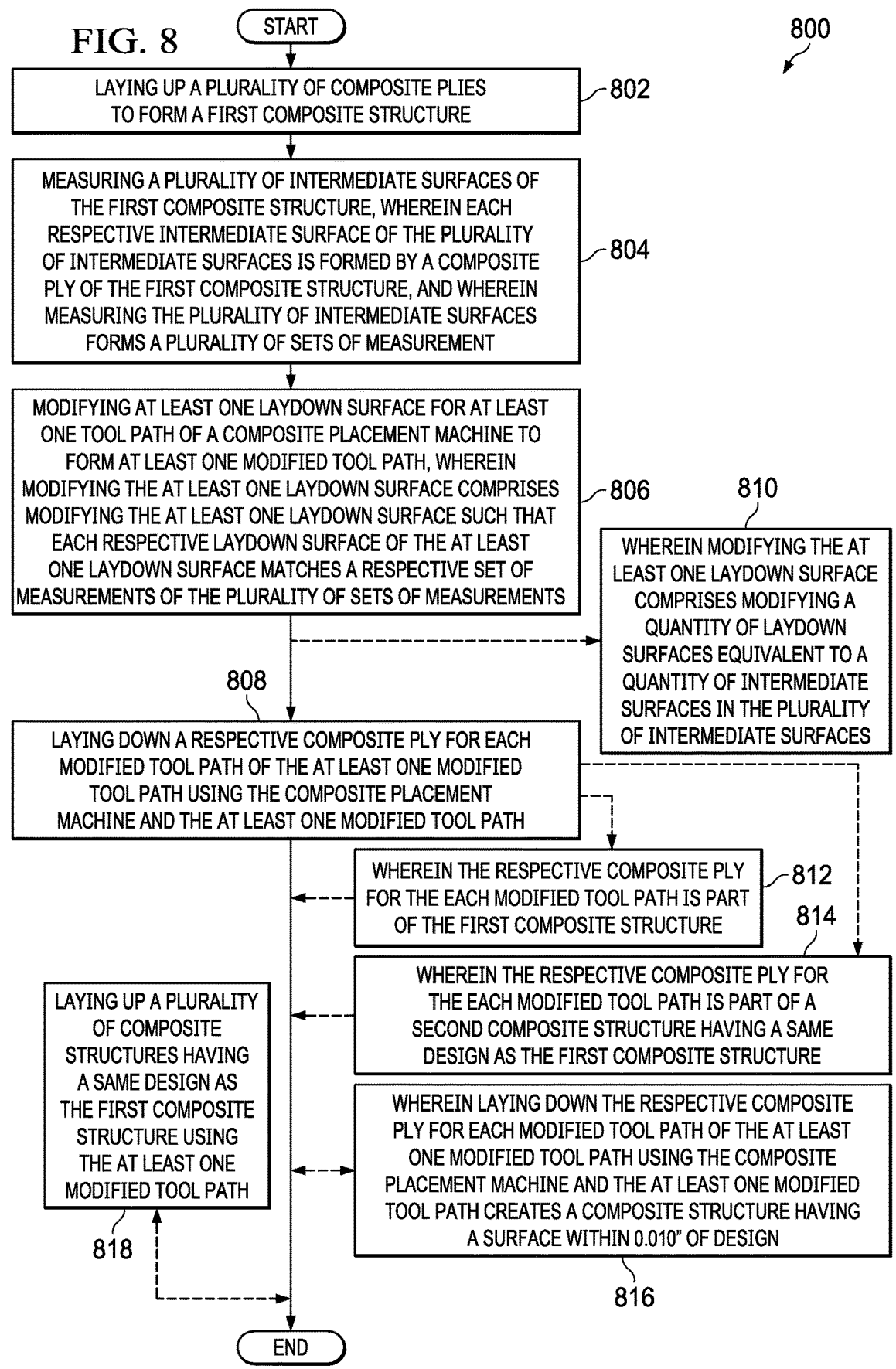

MACHINE CONFIGURED TO FORM A COMPOSITE STRUCTURE

BACKGROUND INFORMATION

1. Field

The present disclosure relates generally to composite manufacturing and, more specifically, to improving surface quality of composite structures. Yet more specifically, the present disclosure relates to using surface measurements to alter tool paths for laying up composite structures.

2. Background

Platforms, such as aircraft and automobiles, are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

When joining two components, surface dimensions of the two components affect the interface. As a result, components made of composite materials may require tight dimensional tolerances of mating surfaces to ensure high quality joining, ideally without the need for shims or other types of precision spacers. Further, it is desirable to reduce inconsistencies within components formed of composite materials.

Therefore, it would be desirable to have a method and apparatus that takes into account at least some of the issues discussed above, as well as other possible issues.

SUMMARY

An illustrative example of the present disclosure provides a method. A first set of composite plies including a first outer ply of a first composite structure is laid up. A first intermediate surface of the first outer ply is measured to form a first set of measurements. A laydown surface for a tool path of a composite placement machine is modified to form a modified tool path, wherein modifying the laydown surface comprises modifying the laydown surface such that a laydown surface of the modified tool path matches the first set of measurements. A composite ply is laid down using the composite placement machine and the modified tool path.

Another illustrative example of the present disclosure provides a method. A plurality of composite plies is laid up to form a first composite structure. A plurality of intermediate surfaces of the first composite structure is measured. Each respective intermediate surface of the plurality of intermediate surfaces is formed by a composite ply of the first composite structure, and wherein measuring the plurality of intermediate surfaces forms a plurality of sets of measurements. At least one laydown surface for at least one tool path of a composite placement machine is modified to form at least one modified tool path, wherein modifying the at least one laydown surface comprises modifying the at least one laydown surface such that each respective laydown surface of at least one laydown surface of the at least one modified tool path matches a respective set of measurements of the plurality of sets of measurements. A respective composite ply is laid down for each modified tool path of the at least one modified tool path using the composite placement machine and the at least one modified tool path.

Yet another illustrative example of the present disclosure provides a system. The system comprises measuring equipment, a tool path generator, and a composite placement machine. The measuring equipment is configured to produce measurements of intermediate surfaces having an accuracy that meets acceptable tolerance for a composite structure. The tool path generator is configured to modify a laydown surface for a tool path of the composite placement machine to form a modified tool path, wherein modifying the laydown surface comprises modifying the laydown surface such that a laydown surface of the modified tool path matches a respective set of measurements generated using the measuring equipment. The composite placement machine is configured to lay down a composite ply using the modified tool path.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of a flowchart of a method for forming a composite structure using intermediate surface measurements in accordance with an illustrative embodiment;

DETAILED DESCRIPTION

Figure 1:
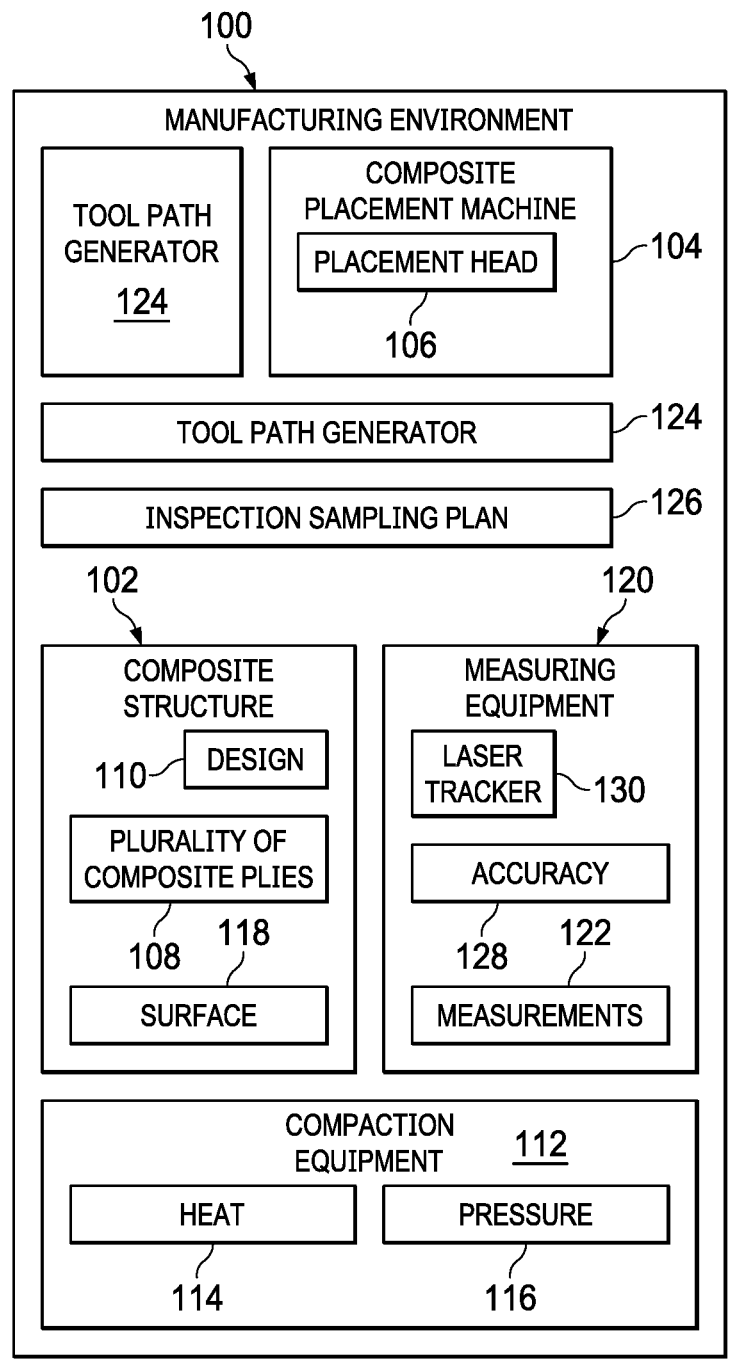
FIG. 1 is an illustration of a block diagram of a manufacturing environment in which a composite structure is manufactured in accordance with an illustrative embodiment.

The illustrative embodiments recognize and take into account one or more different considerations. For example, the illustrative embodiments recognize and take into account that composite materials are tough, light-weight materials created by combining two or more functional components. For example, a composite material may include reinforcing fibers bound in a polymer resin matrix. The fibers may be unidirectional or may take the form of a woven cloth or fabric. The fibers and resins are arranged and consolidated or cured to form a composite material.

The illustrative examples recognize and take into account that in manufacturing composite structures, layers of composite material are typically laid up on a tool. These layers may take the form of fabrics, tape, tows, or other suitable forms. In some cases, resin may be infused or preimpregnated into the layers. These types of layers are commonly referred to as prepreg.

The illustrative examples recognize and take into account that the different layers of prepreg may be laid up in different orientations and different numbers of layers may be used depending on the thickness of the composite structure being manufactured. These layers may be laid up by hand or using automated composite placement equipment such as a tape laminating machine or a fiber placement system.

After the different layers of composite material have been laid up on the tool, the layers of composite material may be consolidated or cured upon exposure to temperature and pressure, thus forming the final composite structure.

The illustrative example recognize and take into account that composite materials may be used in many types of platforms. A platform having composite material components may be, for example, a mobile platform, a stationary platform, a land-based structure, an aquatic-based structure, and a space-based structure. More specifically, a platform may be a surface ship, a tank, a personnel carrier, a train, a spacecraft, a space station, a satellite, a submarine, an automobile, a power plant, a bridge, a dam, a house, a manufacturing facility, a building, and any other suitable type of platform.

The illustrative examples recognize and take into account that in thick composite parts, such as those having 100 plies or more, actual manufactured part thicknesses can vary. The illustrative examples recognize and take into account that tolerances and variances build up, and the surfaces can become less and less accurate.

The illustrative examples recognize and take into account that an as built part may vary from a model or theoretical part due to a number of factors. The illustrative examples recognize and take into account that the number of factors include variability in raw materials, processing conditions, and variability in actual vs. theoretical tool dimensions.

The illustrative examples recognize and take into account that when using automated layup equipment, it may be desired that the machine to have knowledge of the actual surface it is laying down upon to within a specific value. The illustrative examples recognize and take into account that this value may vary by process, by part, or by structural standards or surface quality requirements for the part.

The illustrative example recognize and take into account that when using automated layup equipment, it may be desired that the machine to have knowledge of the actual surface it is laying down upon to within 0.010". The illustrative examples recognize and take into account that more than 0.010" variance can create inconsistencies within the final composite structure. For example, more than 0.010" variance may result in overlaps and gaps, which can undesirably affect structural strength and surface quality.

Turning now to FIG. 1, an illustration of a block diagram of a manufacturing environment in which a composite structure is manufactured is depicted in accordance with an illustrative embodiment. In manufacturing environment 100, composite structure 102 is laid up layer-by-layer using composite placement machine 104. In some illustrative examples, composite placement machine 104 takes the form of placement head 106.

Composite placement machine 104 lays down plurality of composite plies 108 according to design 110 for composite structure 102. During manufacturing of composite structure 102, compaction equipment 112 is used to apply at least one of heat 114 or pressure 116 to composite plies of plurality of composite plies 108. In some illustrative examples, compaction equipment 112 is used repeatedly to apply at least one of heat 114 or pressure 116 during the manufacturing of composite structure 102.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In some illustrative examples, compaction equipment 112 is used to periodically debulk plurality of composite plies 108. In some illustrative examples, compaction equipment 112 is used to perform intermediate debulking steps in manufacturing composite structure 102.

Compaction equipment 112 is used any desirable number of times during the manufacturing of composite structure 102. In some illustrative examples, compaction equipment 112 is used to apply at least one of heat 114 or pressure 116 after a set quantity of plies. For example, compaction equipment 112 may be used to apply at least one of heat 114 or pressure 116 to composite plies each time 10 composite plies, 20 composite plies, or any other desirable set quantity of composite plies is laid down. In these illustrative examples, compaction equipment 112 is used to apply at least one of heat 114 or pressure 116 to the composite plies each time the set quantity of plies is laid down.

In other illustrative examples, compaction equipment 112 is used to apply at least one of heat 114 or pressure 116 after specified intermediate surfaces of composite structure 102. In these illustrative examples, compaction equipment 112 is used to apply at least one of heat 114 or pressure 116 after specific composite plies of plurality of composite plies 108 have been laid down.

Composite structure 102 has surface 118. Surface 118 has quality and thickness requirements. To meet quality and thickness requirements for composite structure 102, measuring equipment 120 is employed within manufacturing environment 100.

Measuring equipment 120 is used to produce measurements 122 of intermediate surfaces. In some illustrative examples, measuring equipment 120 is used to produce measurements 122 of intermediate surfaces of composite structure 102.

In some illustrative examples, measuring equipment 120 is used to produce measurements 122 of intermediate surfaces prior to applying at least one of heat 114 or pressure 116 to the intermediate surfaces using compaction equipment 112. For example, measuring equipment 120 may be used to produce measurements 122 of a first intermediate surface prior to applying at least one of heat 114 or pressure 116 to the first intermediate surface using compaction equipment 112.

In some illustrative examples, measuring equipment 120 is used to produce measurements 122 of intermediate surfaces after applying at least one of heat 114 or pressure 116 to the intermediate surfaces using compaction equipment 112. For example, measuring equipment 120 may be used to produce measurements 122 of a first intermediate surface after applying at least one of heat 114 or pressure 116 to the first intermediate surface using compaction equipment 112.

In some illustrative examples, tool path generator 124 uses measurements 122 to generate tool paths for composite placement machine 104. When tool path generator 124 uses measurements 122 of composite structure 102 to generate tool paths for forming composite structure 102, the measuring may be referred to as "in situ."

In some illustrative examples, in situ measuring and layups are implemented when composite structure 102 is a single build structure. In some illustrative examples, in situ measuring and layups are implemented when composite structure 102 is costly or time-consuming to produce.

In some illustrative examples, measurements 122 of composite structure 102 are part of inspection sampling plan 126. In some illustrative examples, measurements 122 of composite structure 102 for inspection sampling plan 126 are used to monitor for manufacturing changes.

In other illustrative examples, measuring equipment 120 is used to produce measurements 122 of other composite structures. In these illustrative examples, measurements 122 from other composite structures may be applied to forming composite structure 102. For example, measurements 122 from other composite structures using inspection sampling plan 126 are used to create composite structure 102 with surface 118 having desirable quality and desirable thickness. In these examples, measurements 122 from other composite structures using inspection sampling plan 126 are used by tool path generator 124 to form tool paths for laying down plurality of composite plies 108.

In yet other illustrative examples, measuring equipment 120 is used to produce measurements 122 of a first composite structure having the same design, design 110, of composite structure 102. In these illustrative examples, measurements 122 of the first composite structure are used to form tool paths for composite placement machine 104 to lay down plurality of composite plies 108. In these illustrative examples, measurements 122 are used to form composite structure 102 with surface 118 having desirable quality and desirable thickness.

Measuring equipment 120 has accuracy 128 that meets acceptable tolerance for surface 118. In some illustrative examples, when tolerance for surface is +/−0.01", accuracy 128 is at least 0.001". In some illustrative examples, measuring equipment 120 takes the form of laser tracker 130.

The illustration of manufacturing environment 100 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

Figure 2:
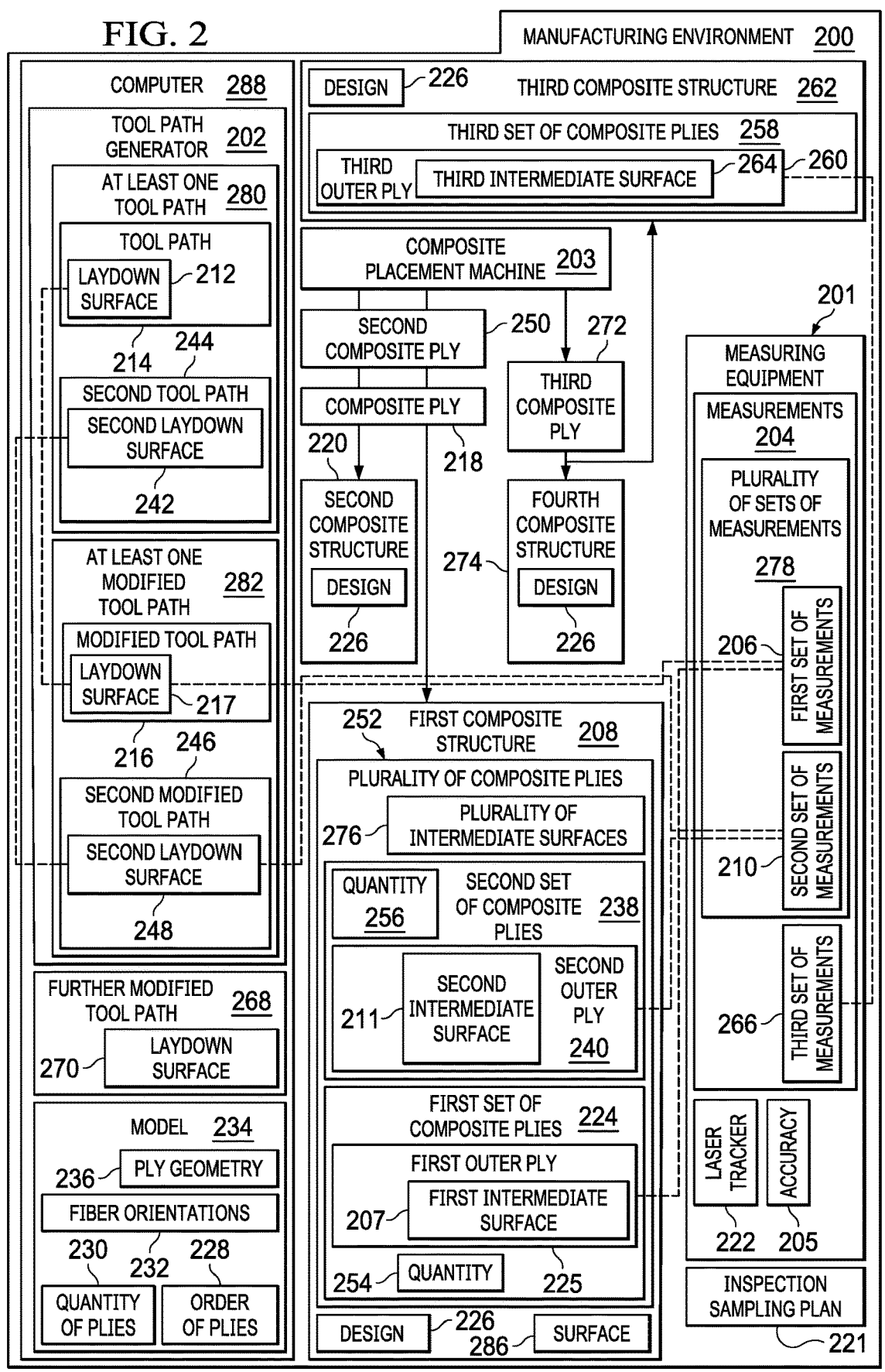
FIG. 2 is an illustration of a block diagram of a manufacturing environment in which a composite structure is manufactured in accordance with an illustrative embodiment.

Turning now to FIG. 2, an illustration of a block diagram of a manufacturing environment in which a composite structure is manufactured is depicted in accordance with an illustrative embodiment. Manufacturing environment 200 may be the same as manufacturing environment 100.

Manufacturing environment 200 includes measuring equipment 201, tool path generator 202, and composite placement machine 203. Measuring equipment 201 is configured to produce measurements 204 of intermediate surfaces having accuracy 205 that meets acceptable tolerance for a composite structure.

The intermediate surfaces are any desirable surfaces of composite structures in manufacturing environment 100. For example, measuring equipment 201 may generate first set of measurements 206 of first intermediate surface 207 of first composite structure 208. As another example, measuring equipment 201 may generate second set of measurements 210 of second intermediate surface 211 of first composite structure 208.

Tool path generator 202 is configured to modify a laydown surface for a tool path of composite placement machine 203 to form a modified tool path. For example, tool path generator 202 may modify laydown surface 212 for tool path 214 of composite placement machine 203 to form modified tool path 216. Modifying the laydown surface comprises modifying the laydown surface such that a laydown surface of the modified tool path matches a respective set of measurements generated using measuring equipment 201. For example, modifying laydown surface 212 comprises modifying laydown surface 212 such that laydown surface 217 matches a respective set of measurements using measuring equipment 201. In some illustrative examples, modifying laydown surface 212 comprises modifying laydown surface 212 such that laydown surface 217 matches first set of measurements 206.

Modified tool path 216 may be used to lay down a composite ply. In some illustrative examples, modified tool path 216 may be used to lay down a composite ply in the same composite structure that received measurements 204. In some illustrative examples, modified tool path 216 may be used to lay down a composite ply in at least one subsequent composite structure.

Composite placement machine 203 is configured to lay down composite ply 218 using modified tool path 216. In some illustrative examples, composite ply 218 is laid up on a composite structure that was measured, such as first composite structure 208. In some illustrative examples, composite ply 218 is laid up on a subsequent composite structure, such as second composite structure 220.

Measuring equipment 201, tool path generator 202, and composite placement machine 203 are used to lay up composite structures with desirable surface quality and desirable surface thickness. In some illustrative examples, measuring equipment 201, tool path generator 202, and composite placement machine 203 are used to layup a single composite structure, first composite structure 208. In this illustrative example, measuring and updates to tool paths for composite placement machine 203 are performed in situ. In situ measurements and adjustments make changes to first composite structure 208 during the layup of first composite structure 208.

In other illustrative examples, measuring equipment 201, tool path generator 202, and composite placement machine 203 are used to layup a plurality of composite structures. In these illustrative examples, measurements from a respective composite structure may be applied to laying down composite plies of subsequent composite structures. In some illustrative examples, measurements 204 are part of inspection sampling plan 221.

Accuracy 205 of measuring equipment 201 is selected to provide desirable quality for surfaces of composite structures. For example, if thickness of first composite structure 208 is to be controlled to within 0.01", accuracy 205 may be desirably at least 0.001". In some illustrative examples, measuring equipment 201 is configured to produce measurements 204 of intermediate surfaces having accuracy 205 of at least 0.001". In some illustrative examples, measuring equipment 201 takes the form of laser tracker 222.

In some illustrative examples, first set of composite plies 224 including first outer ply 225 of first composite structure 208 is laid up. As used herein, a "set" of items is one or more items.

First intermediate surface 207 of first outer ply 225 is measured to form first set of measurements 206. Laydown surface 212 for tool path 214 of composite placement machine 203 is modified to form modified tool path 216. In some illustrative examples, modifying laydown surface 212 comprises modifying laydown surface 212 such that laydown surface 217 of modified tool path 216 matches first set of measurements 206.

Composite ply 218 is laid down using composite placement machine 203 and modified tool path 216. In some illustrative examples, composite ply 218 is a portion of first composite structure 208. In these illustrative examples, composite ply 218 is laid up onto first outer ply 225.

In other illustrative examples, composite ply 218 is part of second composite structure 220 having a same design as first composite structure 208. As depicted, second composite structure 220 and first composite structure 208 both have design 226.

When first composite structure 208 and second composite structure 220 have the same design, design 226, features of first composite structure 208 and second composite structure 220, such as order of plies 228, quantity of plies 230, and fiber orientations 232 may be the same. Order of plies 228, quantity of plies 230, and fiber orientations 232 may be present in model 234 common to both first composite structure 208 and second composite structure 220. In some illustrative examples, ply geometry 236 of model 234 may change slightly between first composite structure 208 and second composite structure 220 due to modifying tool path 214. In one illustrative example, if tool path 214 changes in length to become modified tool path 216, a length of a respective composite ply changes to follow modified tool path 216.

In some non-depicted illustrative examples, second composite structure 220 and first composite structure 208 do not have the same design but do have the same or similar processing characteristics. In some illustrative examples, the same characteristics include at least one of ply material, ply thickness, composite placement machine type, composite placement machine lay down settings, compaction heat, or compaction pressure.

In some illustrative examples, after laying up first set of composite plies 224, second set of composite plies 238 are laid up onto first outer ply 225. Second set of composite plies 238 includes second outer ply 240.

In some illustrative examples, second intermediate surface 211 of second outer ply 240 is measured to form second set of measurements 210. Second set of measurements 210 may be used to modify a tool path for first composite structure 208 or subsequent composite structures.

In some illustrative examples, second laydown surface 242 for second tool path 244 of composite placement machine 203 is modified to form second modified tool path 246. In some illustrative examples, modifying second laydown surface 242 comprises modifying second laydown surface 242 such that second laydown surface 248 of second modified tool path 246 matches second set of measurements 210.

Afterwards, in some illustrative examples, second composite ply 250 is laid down using composite placement machine 203 and second modified tool path 246. In some illustrative examples, second composite ply 250 is laid up as part of first composite structure 208. In these illustrative examples, second composite ply 250 is laid up on second outer ply 240. In other illustrative examples, second composite ply 250 is laid up as part of second composite structure 220. In some illustrative examples, second composite ply 250 is laid up as a different subsequent composite structure.

In some illustrative examples, first set of composite plies 224 is compacted using at least one of heat or pressure after measuring first intermediate surface 207. For example, first set of composite plies 224 may be laid up, first intermediate surface 207 measured, and then first set of composite plies 224 compacted using compaction equipment 112 of FIG. 1 to apply heat 114 or pressure 116 of FIG. 1.

In some other illustrative examples, first set of composite plies 224 is compacted using at least one of heat or pressure prior to measuring first intermediate surface 207. For example, first set of composite plies 224 may be laid up, compacted using compaction equipment 112 of FIG. 1 to apply heat 114 or pressure 116 of FIG. 1, and then first intermediate surface 207 is measured.

Compaction equipment 112 may apply heat 114 or pressure 116 to any desirable plies of plurality of composite plies 252 of first composite structure 208 during manufacturing of first composite structure 208. Compaction equipment 112 may include any desirable components such as vacuum equipment, pneumatic equipment, an autoclave, or any other desirable equipment.

First set of composite plies 224 has any desirable one of quantity 254 of plies. In some illustrative examples, first set of composite plies 224 has quantity 254 of plies between 10 and 20. In some illustrative examples, quantity 254 of plies is less than plies. In some illustrative examples, quantity 254 of plies is greater than 20 plies.

Second set of composite plies 238 has any desirable one of quantity 256 of plies. In some illustrative examples, quantity 254 and quantity 256 are the same. In some illustrative examples, quantity 254 and quantity 256 are in the same range. For example, quantity 254 and quantity 256 may both be in the range of 10 to 20 plies. In other illustrative examples, quantity 254 and quantity 256 are different.

In some illustrative examples, third set of composite plies 258 is laid up including third outer ply 260 of third composite structure 262. In some illustrative examples, third intermediate surface 264 of third outer ply 260 is measured to form third set of measurements 266.

As depicted, third composite structure 262 has design 226. When third composite structure 262 has design 226, third set of measurements 266 may be used to monitor manufacturing.

In some illustrative examples, laydown surface 217 for modified tool path 216 of composite placement machine 203 is modified to form further modified tool path 268. In some illustrative examples, modifying laydown surface 217 comprises modifying laydown surface 217 such that laydown surface 270 of further modified tool path 268 matches third set of measurements 266.

In some illustrative examples, third composite ply 272 is laid down using composite placement machine 203 and further modified tool path 268. In some illustrative examples, third composite ply 272 is a part of third composite structure 262. In these illustrative examples, third composite ply 272 is laid up on third outer ply 260.

In some illustrative examples, third composite ply 272 is part of fourth composite structure 274 having a same design as third composite structure 262. In these illustrative examples, fourth composite structure 274 also has design 226.

Forming first composite structure 208 comprises laying up plurality of composite plies 252. In some illustrative examples, plurality of intermediate surfaces 276 of first composite structure 208 are measured during lay up of plurality of composite plies 252. Plurality of intermediate surfaces 276 are surfaces formed by pausing the operation of composite placement machine 203 during layup of first composite structure 208. In some illustrative examples, plurality of intermediate surfaces 276 are formed by laying down plies using composite placement machine 203. In some illustrative examples, plurality of intermediate surfaces 276 are formed by compaction equipment, such as compaction equipment 112. In these illustrative examples, plurality of intermediate surfaces 276 are formed by debulking steps.

In some illustrative examples, plurality of intermediate surfaces 276 of first composite structure 208 are measured. Each respective intermediate surface of plurality of intermediate surfaces 276 is formed by a composite ply of first composite structure 208. Measuring plurality of intermediate surfaces 276 forms plurality of sets of measurements 278. As depicted, plurality of sets of measurements 278 includes first set of measurements 206 and second set of measurements 210. In other illustrative examples, plurality of sets of measurements 278 includes other sets of measurements that are not depicted here for simplicity.

At least one laydown surface for at least one tool path 280 of composite placement machine 203 is modified to form at least one modified tool path 282. In some illustrative examples, modifying the at least one laydown surface comprises modifying the at least one laydown surface such that each respective laydown surface of at least one laydown surface of at least one modified tool path 282 matches a respective set of measurements of the plurality of sets of measurements 278.

In some illustrative examples, a respective composite ply is laid down for each modified tool path of the at least one modified tool path 282 using composite placement machine 203 and at least one modified tool path 282. In some illustrative examples, the respective composite ply for the each modified tool path is part of first composite structure 208. In some illustrative examples, the respective composite ply for the each modified tool path is part of second composite structure 220 having a same design as first composite structure 208.

In some illustrative examples, the at least one modified tool path is modified after laying up first composite structure 208. In other illustrative examples, the at least one modified tool path is modified while laying up first composite structure 208 to also modify first composite structure 208.

In some illustrative examples, modifying the at least one laydown surface comprises modifying a quantity of laydown surfaces equivalent to a quantity of intermediate surfaces in the plurality of intermediate surfaces 276. In some illustrative examples, a plurality of composite structures having a same design as first composite structure 208 are laid up using the at least one modified tool path. For example, second composite structure 220, third composite structure 262, and fourth composite structure 274 may be laid up using the at least one modified tool path.

In some illustrative examples, laying down the respective composite ply for each modified tool path of the at least one modified tool path 282 using composite placement machine 203 and the at least one modified tool path creates a composite structure having a surface within 0.010" of design. For example, when the composite structure may be first composite structure 208 having surface 286 within 0.010" of design 226.

The illustration of manufacturing environment 200 in FIG. 2 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, although not depicted, composite placement machine 203 may take the form of a placement head. The placement head may be a part of an automated tape placement (ATP) or automated fiber placement (AFP) system.

As another example, although both model 234 and tool path generator 202 are depicted on computer 288, in some illustrative examples model 234 and tool path generator 202 are stored on separate computers or computer systems. As another example, computer 288 may be present outside of manufacturing environment 200 in some illustrative examples.

Figure 3:
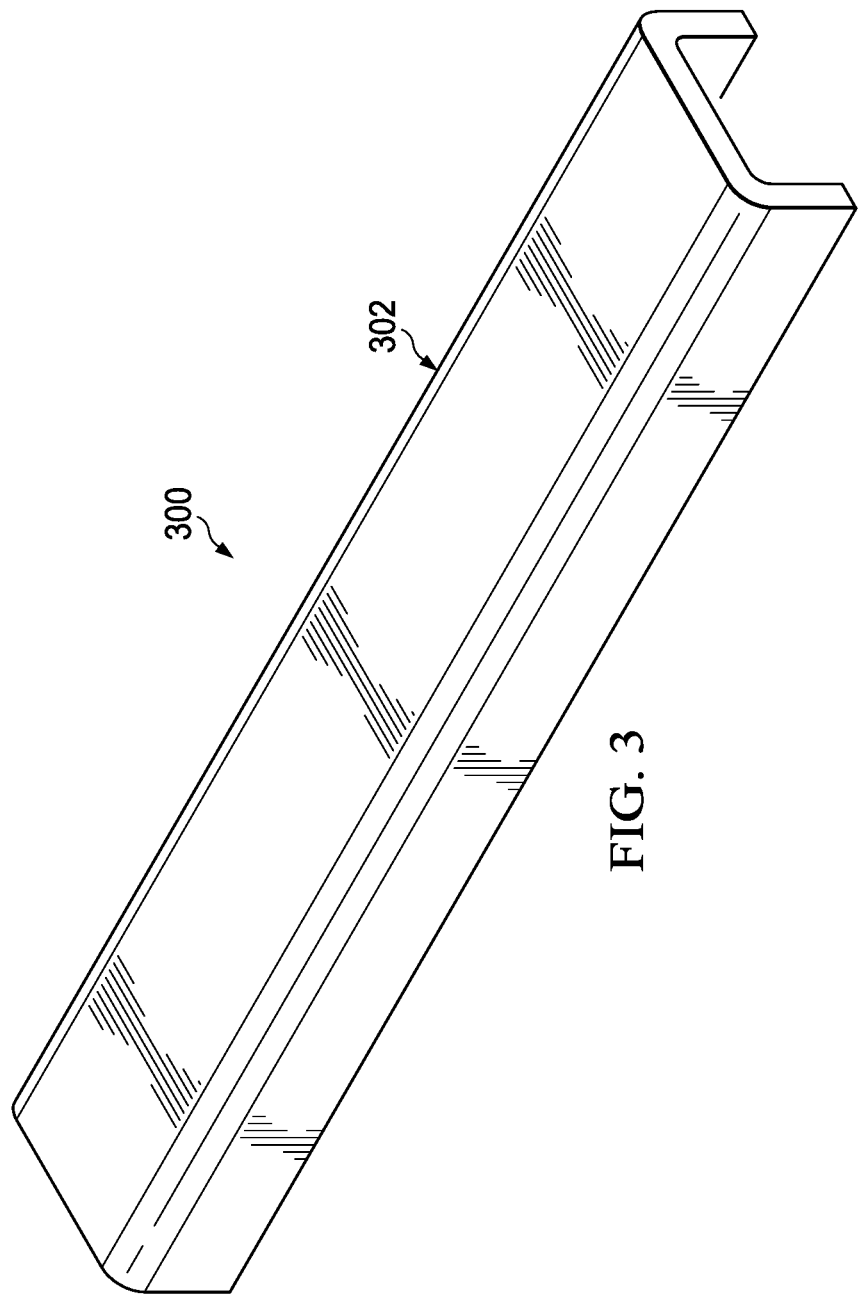
FIG. 3 is an illustration of an isometric view of a composite structure in accordance with an illustrative embodiment.

Turning now to FIG. 3, an illustration of an isometric view of a composite structure is depicted in accordance with an illustrative embodiment. In some illustrative examples, composite structure 300 is a physical implementation of composite structure 102 of FIG. 1. Composite structure 300 may be a physical implementation of one of first composite structure 208, second composite structure 220, third composite structure 262, or fourth composite structure 274.

Composite structure 300 is formed by laying up plurality of plies 302 forming composite structure 300. In some illustrative examples, intermediate surfaces formed by plies of plurality of plies 302 are measured during layup of composite structure 300.

In some illustrative examples, these measurements of the intermediate surfaces of composite structure 300 are used to control the dimensions and surface quality of composite structure 300. In some illustrative examples, these measurements are used to control dimensions and surface quality of subsequent composite structures laid up after composite structure 300.

In some illustrative examples, measurements of intermediate surfaces of composite structure 300 are part of an inspection sampling plan. In some illustrative examples, measurements of intermediate surfaces of composite structure 300 are used to monitor conditions of a manufacturing line.

Composite structure 300 may have any desirable quantity of composite plies in plurality of plies 302. In some illustrative examples, composite structure 300 has more than one hundred composite plies. As a quantity of composite plies in composite structure 300 increases, manufacturing tolerances may be compounded. In some illustrative examples, as quantity of composite plies in composite structure 300 increases, a difference between an expected surface and a produced surface may increase.

Figure 4:
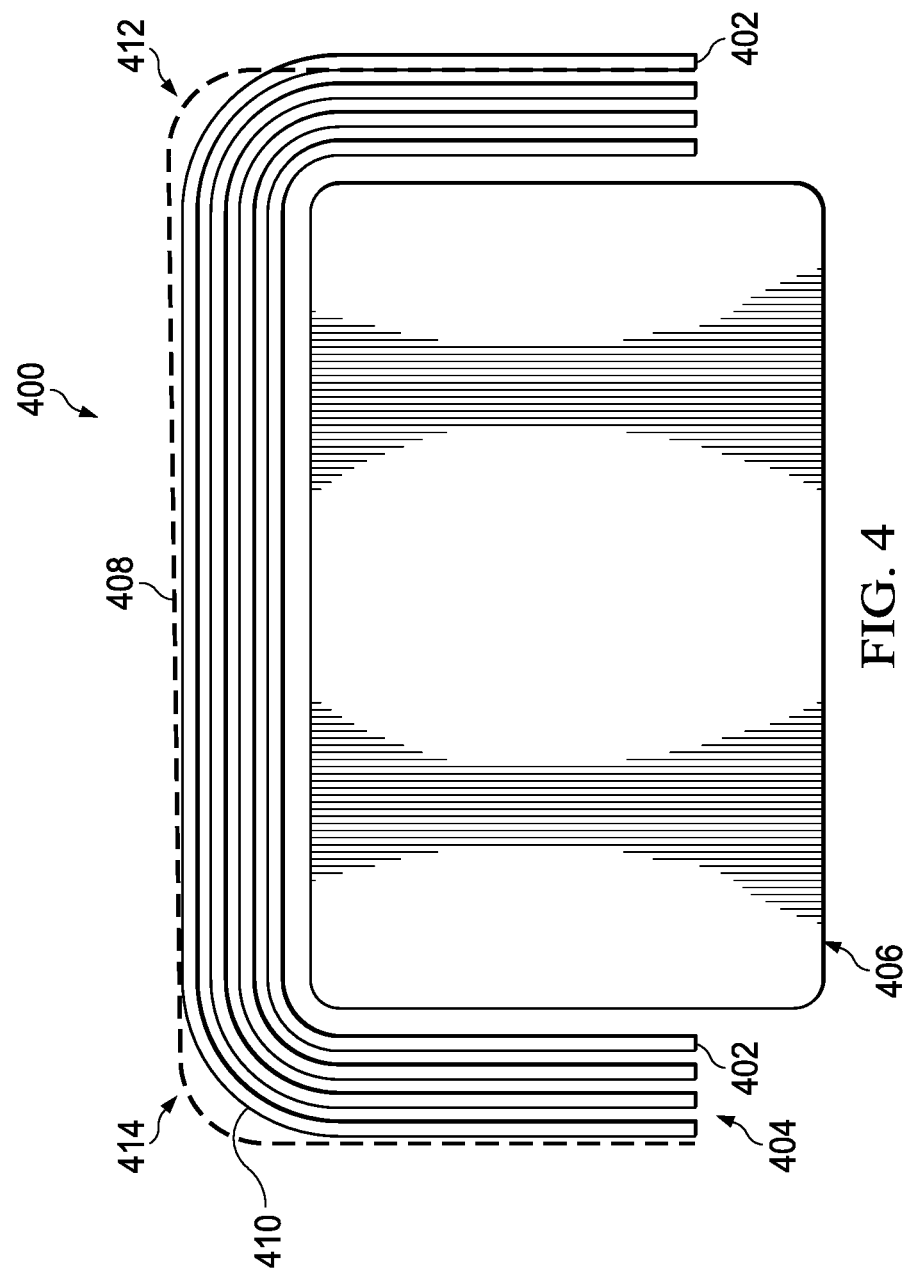
FIG. 4 is an illustration of a cross-sectional view of an intermediate surface of a composite structure in accordance with an illustrative embodiment.

Turning now to FIG. 4, an illustration of a cross-sectional view of an intermediate surface of a composite structure is depicted in accordance with an illustrative embodiment. In view 400 of composite structure 402, first set of composite plies 404 has been laid up on layup tool 406. Prior to laying up first set of composite plies 404, layup tool 406 is measured using a measuring equipment, such as measuring equipment 120 of FIG. 1 or measuring equipment 201 of FIG. 2. In some illustrative examples, a previous measurement or stored measurement of layup tool 406 is used. In some illustrative examples, the measuring equipment takes the form of a laser tracker.

After measuring layup tool 406, expected surface 408 is determined. Expected surface 408 is formed using at least one of ply thickness or prior measurements. In some illustrative examples, expected surface 408 is determined using a quantity of plies in first set of composite plies 404 and a thickness of each ply in first set of composite plies 404. In some illustrative examples, the thickness may be an expected or specified ply thickness. The thickness may be provided by manufacturer specifications, historical thicknesses, or any other desirable data. In some illustrative examples, the thickness may be an actual ply thickness from measuring the thickness of plies to be laid down.

In some illustrative examples, expected surface 408 is determined from inspection of a prior composite structure. As depicted, first set of composite plies 404 on layup tool 406 forms intermediate surface 410. As depicted, intermediate surface 410 is different from expected surface 408.

Differences between intermediate surface 410 and expected surface 408 may cause inconsistencies within composite structure 402. Differences between intermediate surface 410 and expected surface 408 may be exaggerated in future plies laid up on intermediate surface 410. In some illustrative examples, laying up additional plies using expected surface 408 results in variability of the laminate quality, such as overlaps or gaps between the tows or courses placed by the composite placement machine. In some illustrative examples, laying up additional plies using expected surface 408 results in wrinkles or depressions.

In some illustrative examples, a tool path for a composite placement machine is modified to form a modified tool path prior to laying down subsequent plies onto intermediate surface 410. In other illustrative examples, the tool path remains unchanged and subsequent plies are laid onto intermediate surface 410 using a tool path for expected surface 408. In some illustrative examples, the tool path remains unchanged when composite structure 402 is a preliminary structure created for gathering measurements. In some illustrative examples, the tool path remains unchanged when differences between expected surface 408 and intermediate surface 410 do not exceed a threshold.

As depicted, intermediate surface 410 is not planar. As depicted, intermediate surface 410 includes curve 412 and curve 414. Intermediate surface 410 can have any desirable geometry.

The illustration of manufacturing environment 100 in FIG. 1, manufacturing environment 200 in FIG. 2, composite structure 300 in FIG. 3, and composite structure 402 in FIG. 4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in view 400, four plies are depicted for simplicity. Any desired quantity of plies may be present in first set of composite plies 404. Further, in view 400, spacing is visible between first set of composite plies 404. This illustration is provided for descriptive purposes and is not intended to limit implementations of composite structure 402.

The different components shown in FIGS. 3 and 4 may be combined with components in FIGS. 1 and 2, used with components in FIGS. 1 and 2, or a combination of the two. Additionally, some of the components in FIGS. 3 and 4 may be illustrative examples of how components shown in block form in FIGS. 1 and 2 may be implemented as physical structures.

Figure 5:
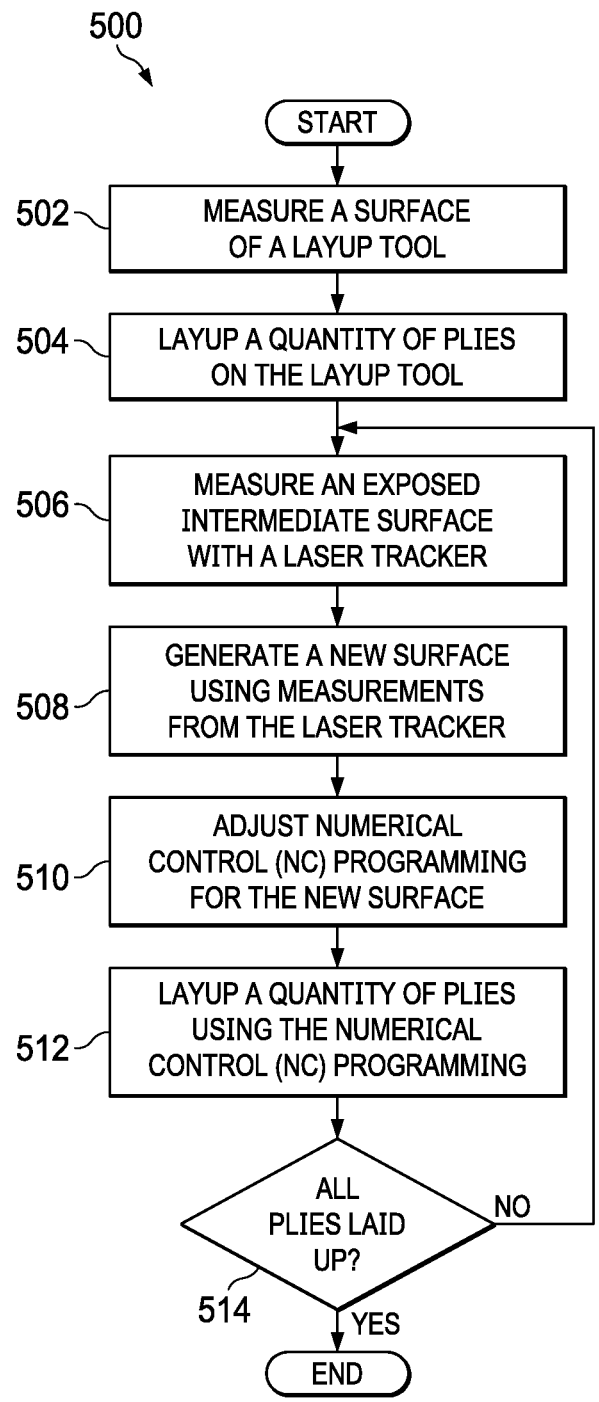
FIG. 5 is an illustration of a flowchart of a method for forming a composite structure with in situ measurements in accordance with an illustrative embodiment.

Turning now to FIG. 5, an illustration of a flowchart of a method for forming a composite structure with in situ measurements is depicted in accordance with an illustrative embodiment. Method 500 may be implemented in manufacturing environment 100 of FIG. 1 to layup composite structure 102. Method 500 may be implemented in manufacturing environment 200 of FIG. 2 to layup first composite structure 208, second composite structure 220, third composite structure 262, or fourth composite structure 274. Method 500 may be used to form composite structure 300 of FIG. 3. View 400 of FIG. 4 may be a view of composite structure 402 as operations of method 500 are performed.

Method 500 measures a surface of a layup tool (operation 502). The layup tool is a tool upon which composite plies will be laid up to form a composite structure. Method 500 lays up a quantity of plies on the layup tool (operation 504). The quantity of plies is any desirable quantity of plies. In some illustrative examples, the quantity of plies is between 10 and 20 plies. In some illustrative examples, the quantity of plies is less than 10 plies. In some illustrative examples, the quantity of plies is greater than 20 plies. In some illustrative examples, the quantity of plies is selected based on compaction steps.

Method 500 measures an exposed intermediate surface with a laser tracker (operation 506). The exposed intermediate surface is formed by a last composite ply that was laid down. The exposed intermediate surface may have a different size or shape than expected. For example, a quantity of plies, type of plies, amount of compaction, length of time of compaction, or other processing parameters may change thicknesses of plies present in the composite structure. As another example, a quantity of plies, type of plies, amount of compaction, length of time of compaction, or other processing parameters may cause the thickness of the plies to vary within the composite structure.

Although operation 506 is described as being performed by a laser tracker, in other illustrative examples, operation

506 may be performed using any desirable measuring equipment. Measuring equipment used to perform operation 506 has accuracy selected to provide desirable quality for surfaces of composite structures.

Method 500 generates a new surface using measurements from the laser tracker (operation 508). The new surface is used to create tool paths for controlling a composite placement machine, such as composite placement machine 104 of FIG. 1.

Method 500 adjusts numerical control (NC) programming for the new surface (operation 510). Adjusting the numerical control programming creates the tool paths for controlling the composite placement machine.

Method 500 lays up a quantity of plies using the numerical control (NC) programming (operation 512). The quantity of plies is laid up directly onto the exposed intermediate surface.

In operation 514, it is determined if all plies of the composite structure have been laid up. If all plies have been laid up (operation 514), method 500 ends. If all plies have not been laid up (operation 514), operations 506 through 514 are repeated until all plies have been laid up. Afterwards, method 500 terminates.

Figure 6:
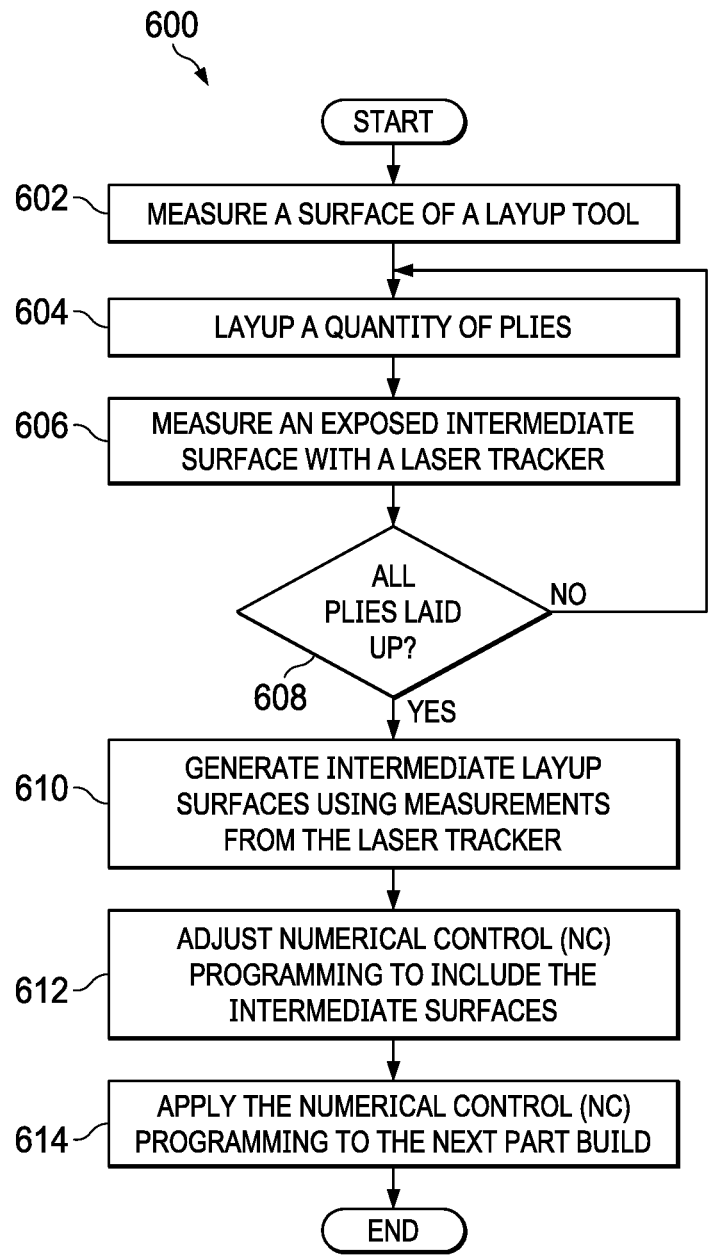
FIG. 6 is an illustration of a flowchart of a method for performing measurements and applying changes to a subsequent composite structure in accordance with an illustrative embodiment.

Turning now to FIG. 6, an illustration of a flowchart of a method for performing measurements and applying changes to a subsequent composite structure is depicted in accordance with an illustrative embodiment. Method 600 may be implemented in manufacturing environment 100 of FIG. 1 to layup composite structure 102. Method 600 may be implemented in manufacturing environment 200 of FIG. 2 to layup first composite structure 208, second composite structure 220, third composite structure 262, or fourth composite structure 274. Method 600 may be used to form composite structure 300 of FIG. 3. View 400 of FIG. 4 may be a view of composite structure 402 as operations of method 600 are performed.

Method 600 measures a surface of a layup tool (operation 602). Method 600 lays up a quantity of plies (operation 604). The quantity of plies is any desirable quantity of plies. In some illustrative examples, the quantity of plies is between 10 and 20 plies. In some illustrative examples, the quantity of plies is less than 10 plies. In some illustrative examples, the quantity of plies is greater than 20 plies. In some illustrative examples, the quantity of plies is selected based on compaction steps.

Method 600 measures an exposed intermediate surface with a laser tracker (operation 606). The exposed intermediate surface is formed by a last composite ply that was laid down. The exposed intermediate surface may have a different size or shape than expected. For example, a quantity of plies, type of plies, amount of compaction, length of time of compaction, or other processing parameters may change thicknesses of plies present in the composite structure. As another example, a quantity of plies, type of plies, amount of compaction, length of time of compaction, or other processing parameters may cause the thickness of the plies to vary within the composite structure.

Although operation 606 is described as being performed by a laser tracker, in other illustrative examples, operation 606 may be performed using any desirable measuring equipment. Measuring equipment used to perform operation 606 has accuracy selected to provide desirable quality for surfaces of composite structures.

Method 600 determines if all plies have been laid up (operation 608). If all plies have not been laid up, method 600 repeats operations 604 through 608. When operations 604 through 608 are repeatedly performed, multiple intermediate surfaces are measured. When operations 604 through 608 are repeatedly performed, any desirable quantity of plies may be laid down for each subsequent performance of operation 604. Each layup of a quantity of plies need not have the same quantity as any previous layup of plies.

If all plies have been laid up, method 600 generates intermediate layup surfaces using measurements from the laser tracker (operation 610). Each of the intermediate layup surfaces has the same measurements as a respective exposed intermediate surface measured at operation 606.

Method 600 adjusts numerical control (NC) programming to include the intermediate layup surfaces (operation 612). By adjusting numerical control (NC) programming to include the intermediate layup surfaces, method 600 takes into account differences between the exposed intermediate surfaces of operation 606 and an expected intermediate surface.

Method 600 applies the numerical control (NC) programming to the next part build (operation 614). Afterwards, method 600 terminates.

By applying the numerical control (NC) programming to the next part build, a subsequent composite structure is formed taking into account the exposed intermediate surfaces of the composite structure laid up using operations 604 through 608. In some illustrative examples, the numerical control (NC) programming is applied to subsequent composite structures until the numerical control (NC) programming is changed to take into account subsequent measurements. In some illustrative examples, subsequent measurements may be taken from composite structures as part of an inspection sampling plan.

Figure 7A:
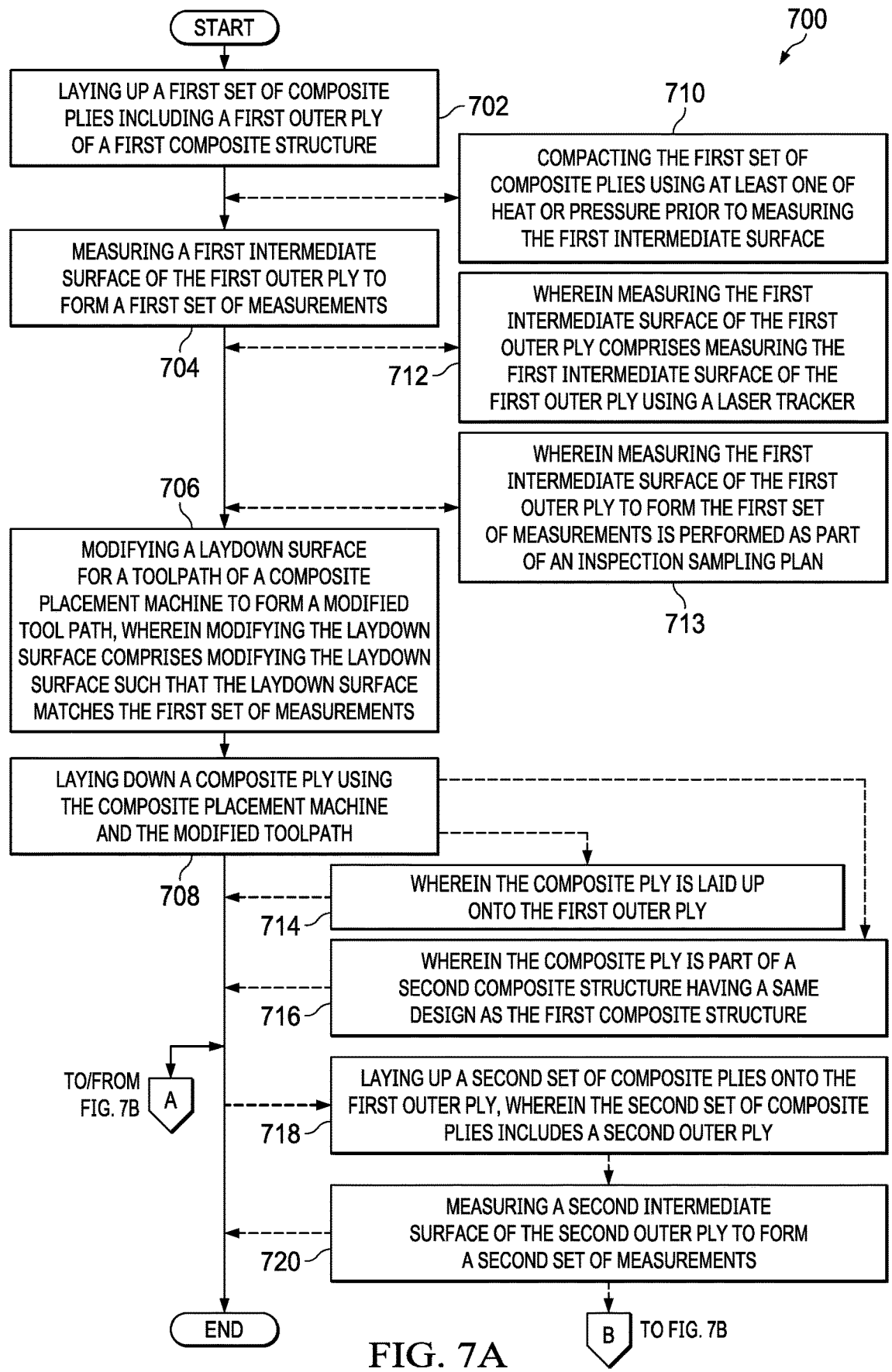
FIGS. 7A and 7B are illustrations of a flowchart of a method for forming a composite structure using intermediate surface measurements in accordance with an illustrative embodiment.
Figure 7B:
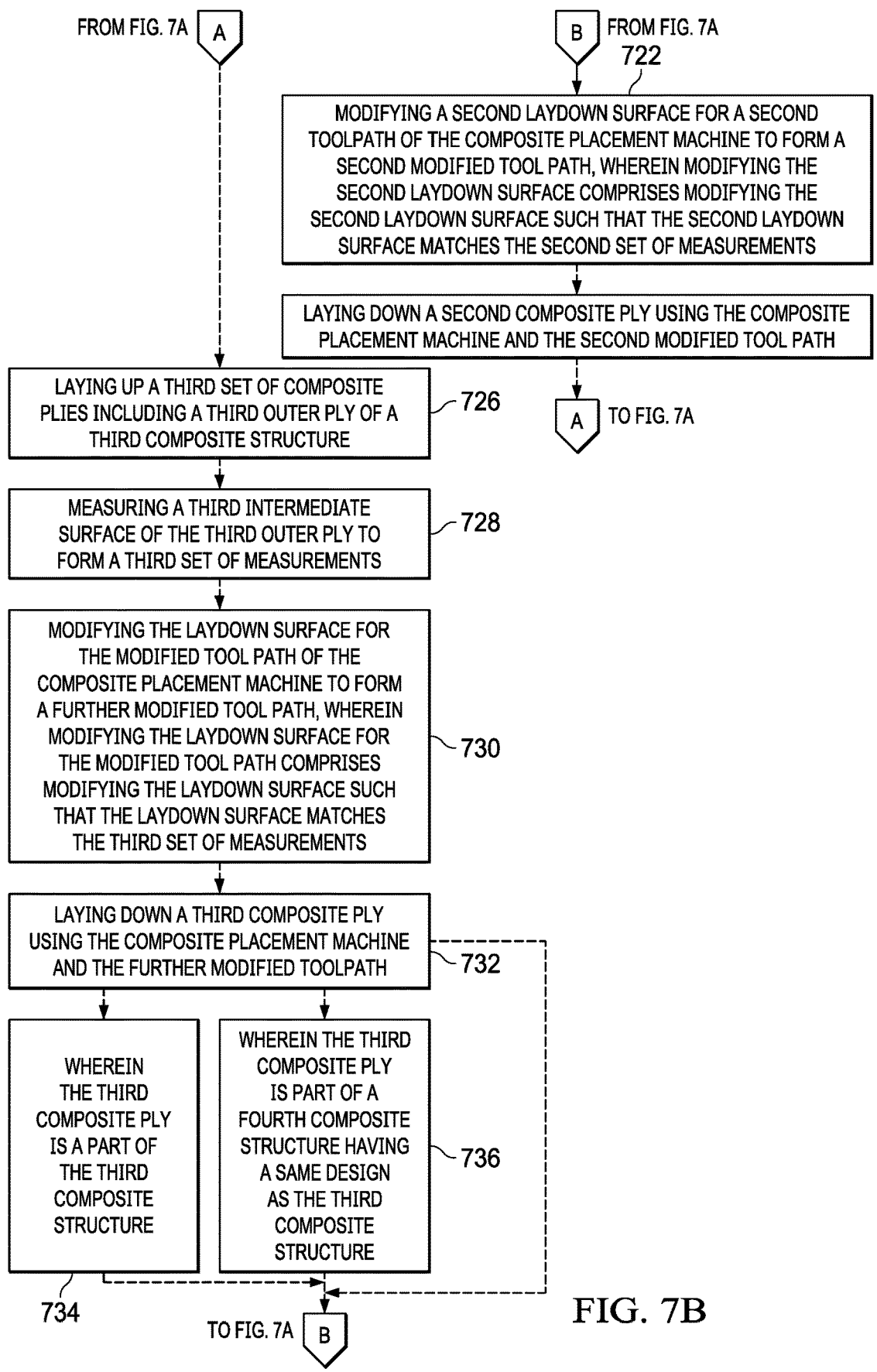

Turning now to FIGS. 7A and 7B, illustrations of a flowchart of a method for forming a composite structure using intermediate surface measurements are depicted in accordance with an illustrative example. Method 700 may be implemented in at least one of manufacturing environment 100 of FIG. 1 or manufacturing environment 200 of FIG. 2. Method 700 may be used to form composite structure 300 of FIG. 3. Method 700 may be performed in view 400 of FIG. 4.

Method 700 lays up a first set of composite plies including a first outer ply of a first composite structure (operation 702). As used herein, the term "first," "second," "third," and other numerical terms are used to distinguish one item from another, not to indicate or suggest the item's position in a series. Although the term "first" is used, the first set of composite plies may not be the initial plies of the first composite structure. Although the term "first" is used, the first composite structure may not be the initially formed composite structure.

The first set of composite plies may be first set of composite plies 224 of FIG. 2 or first set of composite plies 404 of FIG. 4. In some illustrative examples, the first set of composite plies has a quantity based on frequency of compaction steps. In one illustrative example, first set of composite plies has a quantity of plies equivalent to the quantity of plies between laying up an initial ply on a layup tool and a first compaction step. In one illustrative example, first set of composite plies has a quantity of plies equivalent to the quantity of plies laid up between two compaction steps. In some illustrative examples, the first set of composite plies has a quantity of plies between 10 and 20. In some illustrative examples, the quantity of plies is less than 10 plies. In some illustrative examples, the quantity of plies is greater than 20 plies.

Method 700 measures a first intermediate surface of the first outer ply to form a first set of measurements (operation 704). In some illustrative examples, measuring the first intermediate surface of the first outer ply comprises measuring the first intermediate surface of the first outer ply using measuring equipment having an accuracy of at least 0.001".

Method 700 modifies a laydown surface for a tool path of a composite placement machine to form a modified tool path, wherein modifying the laydown surface comprises modifying the laydown surface such that a laydown surface of the modified tool path matches the first set of measurements (operation 706). In some illustrative examples, method 700 modifies the laydown surface for the tool path when the first set of measurements are different from an expected intermediate surface. In some illustrative examples, method 700 modifies the laydown surface for the tool path when the differences between the first set of measurements and an expected intermediate surface exceed a threshold.

Method 700 lays down a composite ply using the composite placement machine and the modified tool path (operation 708). Afterwards, method 700 terminates.

In some illustrative examples, method 700 compacts the first set of composite plies using at least one of heat or pressure prior to measuring the first intermediate surface (operation 710). In some illustrative examples, compaction of the first set of composite plies may change the thickness of at least one ply of the first set of composite plies. In some illustrative examples, compaction of the first set of composite plies causes the first intermediate surface to have a different shape than an expected intermediate surface.

In some illustrative examples, measuring the first intermediate surface of the first outer ply comprises measuring the first intermediate surface of the first outer ply using a laser tracker (operation 712). A laser tracker desirably provides accuracy of at least 0.001". In some illustrative examples, measuring the first intermediate surface of the first outer ply to form the first set of measurements is performed as part of an inspection sampling plan (operation 713). In some illustrative examples, instead of inspecting every intermediate surface of every composite structure, an inspection sampling plan inspects based on a set frequency of inspection with selected procedures.

In some illustrative examples, the composite ply is laid up onto the first outer ply (operation 714). In these illustrative examples, the composite ply is also part of the first composite structure. In these illustrative examples, method 700 is an in-situ process. In these illustrative examples, method 700 is used to measure and adjust the first composite structure.

In some illustrative examples, the composite ply is part of a second composite structure having a same design as the first composite structure (operation 716). In these illustrative examples, the measurements from the first composite structure are used to adjust tool paths for a subsequent composite structure.

In some illustrative examples, the composite ply is part of a second composite structure having same characteristics as the first composite structure. In these illustrative examples, the same characteristics include at least one of ply material, ply thickness, composite placement machine type, composite placement machine lay down settings, compaction heat, or compaction pressure. In these illustrative examples, measurements from the first composite structure may be used to layup subsequent composite structures, even when the subsequent composite structures do not have a same design as the first composite structure.

In some illustrative examples, method 700 lays up a second set of composite plies onto the first outer ply, wherein the second set of composite plies includes a second outer ply (operation 718). The second set of composite plies includes any desirable quantity of composite plies. In some illustrative examples, method 700 measures a second intermediate surface of the second outer ply to form a second set of measurements (operation 720).

In some illustrative examples, method 700 modifies a second laydown surface for a second tool path of the composite placement machine to form a second modified tool path, wherein modifying the second laydown surface comprises modifying the second laydown surface such that a second laydown surface of the second modified tool path matches the second set of measurements (operation 722). In some illustrative examples, method 700 lays down a second composite ply using the composite placement machine and the second modified tool path (operation 724).

In some illustrative examples, method 700 lays up a third set of composite plies including a third outer ply of a third composite structure (operation 726). In some illustrative examples, method 700 measures a third intermediate surface of the third outer ply to form a third set of measurements (operation 728).

In some illustrative examples, the third intermediate surface is a subsequent intermediate surface in a design common to the first composite structure and the third composite structure. In these illustrative examples, the third set of measurements may be used to update a subsequent intermediate surface in NC programming for subsequent composite structures.

In some illustrative examples, the third intermediate surface has the same design as the first intermediate surface. In these illustrative examples, by measuring the third intermediate surface, a manufacturing process may be monitored.

In some illustrative examples, method 700 modifies the laydown surface for the modified tool path of the composite placement machine to form a further modified tool path, wherein modifying the laydown surface for the modified tool path comprises modifying the laydown surface such that a laydown surface of the further modified tool path matches the third set of measurements (operation 730). In some illustrative examples, method 700 lays down a third composite ply using the composite placement machine and the further modified tool path (operation 732).

In some illustrative examples, the third composite ply is a part of the third composite structure (operation 734). In some illustrative examples, the third composite ply is part of a fourth composite structure having a same design as the third composite structure (operation 736).

Turning now to FIG. 8, an illustration of a flowchart of a method for forming a composite structure using intermediate surface measurements is depicted in accordance with an illustrative embodiment. Method 800 may be implemented in at least one of manufacturing environment 100 of FIG. 1 or manufacturing environment 200 of FIG. 2. Method 800 may be used to form composite structure 300 of FIG. 3. Method 800 may be performed in view 400 of FIG. 4.

Method 800 lays up a plurality of composite plies to form a first composite structure (operation 802). Method 800 measures a plurality of intermediate surfaces of the first composite structure, wherein each respective intermediate surface of the plurality of intermediate surfaces is formed by a composite ply of the first composite structure, and wherein measuring the plurality of intermediate surfaces forms a plurality of sets of measurements (operation 804). Method 800 modifies at least one laydown surface for at least one tool path of a composite placement machine to form at least one modified tool path, wherein modifying the at least one laydown surface comprises modifying the at least one laydown surface such that each respective laydown surface of at least one laydown surface of the at least one modified tool path matches a respective set of measurements of the plurality of sets of measurements (operation 806). Method 800 lays down a respective composite ply for each modified tool path of the at least one modified tool path using the composite placement machine and the at least one modified tool path (operation 808). Afterwards, method 800 terminates.

In some illustrative examples, modifying the at least one laydown surface comprises modifying a quantity of laydown surfaces equivalent to a quantity of intermediate surfaces in the plurality of intermediate surfaces (operation 810).

In some illustrative examples, the respective composite ply for the each modified tool path is part of the first composite structure (operation 812).

In some illustrative examples, the respective composite ply for the each modified tool path is part of a second composite structure having a same design as the first composite structure (operation 814).

In some illustrative examples, laying down the respective composite ply for each modified tool path of the at least one modified tool path using the composite placement machine and the at least one modified tool path creates a composite structure having a surface within 0.010" of design (operation 816).

In some illustrative examples, method 800 lays up a plurality of composite structures having a same design as the first composite structure using the at least one modified tool path (operation 818).

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 700 or method 800 are performed. For example, operations 710 through 736 of FIGS. 7A and 7B are optional. As another example, operations 810 through 818 of FIG. 8 are optional.

Figure 9:
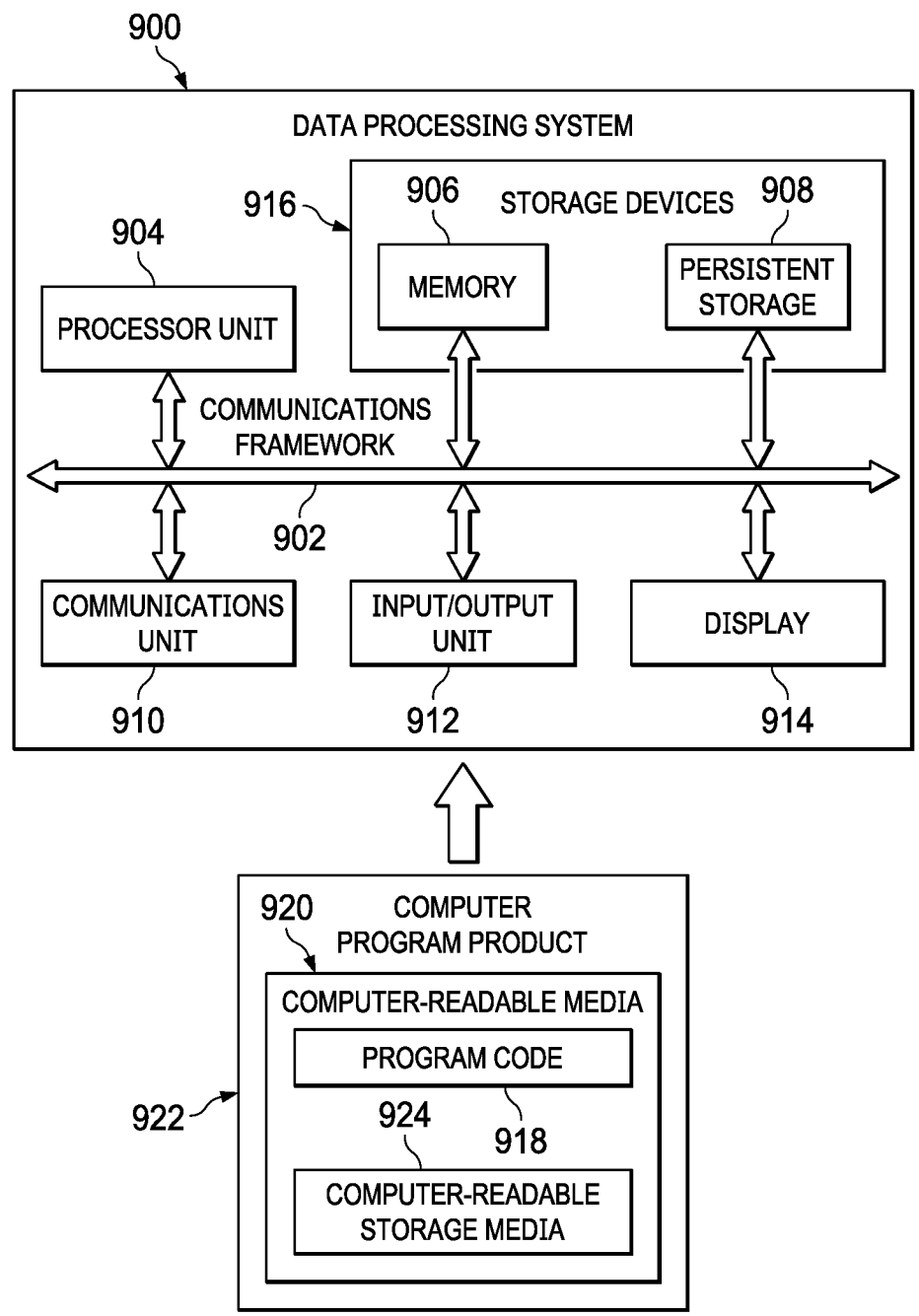
FIG. 9 is an illustration of a data processing system in the form of a block diagram in accordance with an illustrative embodiment.

Turning now to FIG. 9, an illustration of a data processing system in the form of a block diagram is depicted in accordance with an illustrative example. Data processing system 900 may be used to implement computer 288 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer readable storage devices in these illustrative examples. Memory 906, in these examples, may be, for example, a random-access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a solid state hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different examples may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different examples may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In the illustrative example, computer readable media 920 is computer readable storage media 924.

In these illustrative examples, computer readable storage media 924 is a physical or tangible storage device used to store program code 918 rather than a medium that propagates or transmits program code 918.

Alternatively, program code 918 may be transferred to data processing system 900 using a computer readable signal media. The computer readable signal media may be, for example, a propagated data signal containing program code 918. For example, the computer readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different examples may be implemented. The different illustrative examples may be implemented in a data processing system including components in addition to or in place of those illustrated for data processing system 900. Other components shown in FIG. 9 can be varied from the illustrative examples shown. The different examples may be implemented using any hardware device or system capable of running program code 918.

Figure 10:
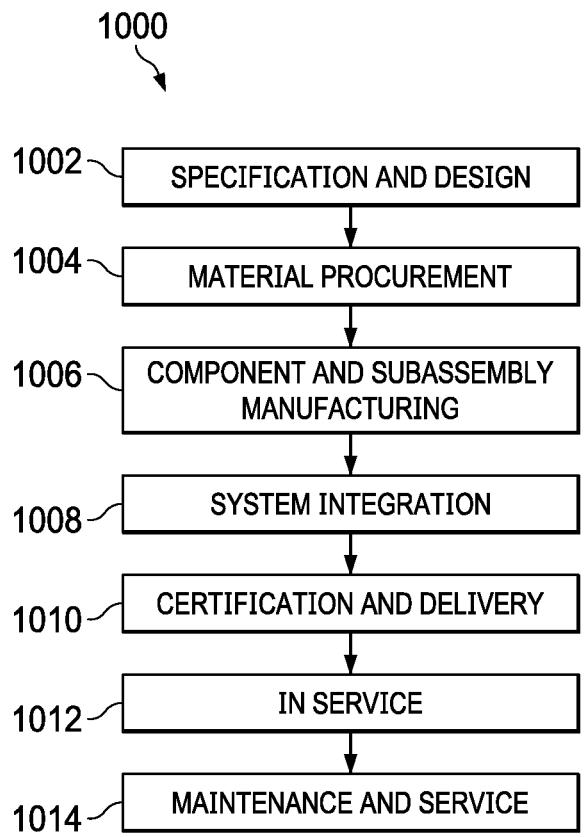
FIG. 10 is an illustration of an aircraft manufacturing and service method in the form of a block diagram in accordance with an illustrative embodiment.
Figure 11:
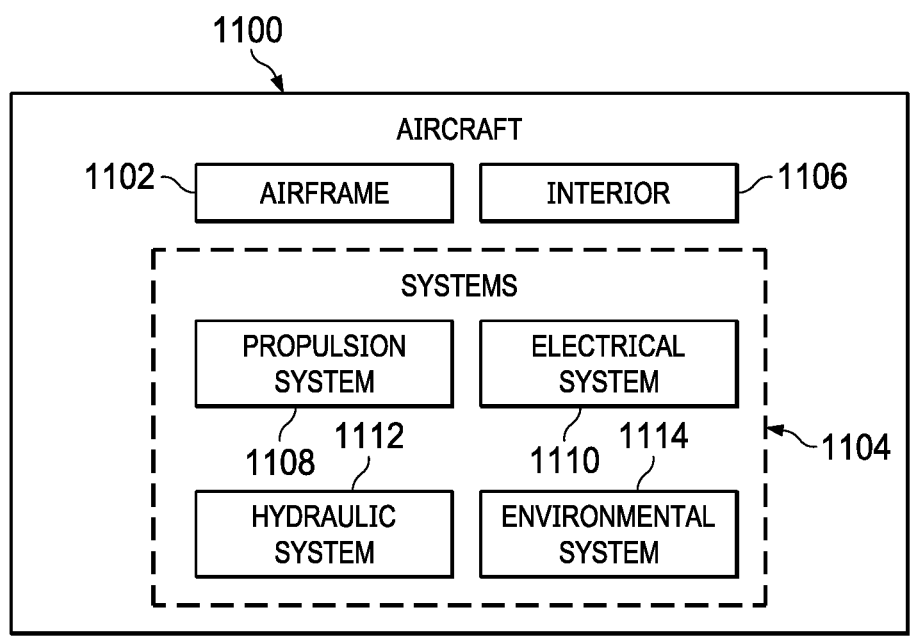
FIG. 11 is an illustration of an aircraft in the form of a block diagram in which an illustrative embodiment may be implemented.

The illustrative examples of the present disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 takes place. Thereafter, aircraft 1100 may go through certification and delivery 1010 in order to be placed in service 1012. While in service 1012 by a customer, aircraft 1100 is scheduled for maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 in FIG. 10 and may include airframe 1102 with a plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1000. One or more illustrative examples may be used during component and subassembly manufacturing 1006, system integration 1008, or maintenance and service 1014 of FIG. 10. For example, tool paths formed by tool path generator 124 may be used to form a component of aircraft 1100, such as composite structure 102, during component and subassembly manufacturing 1006. As another example, composite structure 102 may be a replacement part and tool paths formed by tool path generator 124 may be used to form composite structure 102 during maintenance and service 1014 of FIG. 10.

Apparatuses and methods embodied herein may be employed in manufacturing at least one component of aircraft 1100. For example, composite structure 102 formed using tool paths formed by tool path generator 124 may be a component of one of airframe 1102 or interior 1106.

The illustrative examples take actual measurements on a part surface and uses these measurements to create a digital part surface on which part programming can be based. Using actual measurements may increase the accuracy and quality of the layup rather than using nominal surfaces.

The illustrative examples take accurate surface quality measurements with CAM (Computer Aided Metrology) data. In some illustrative examples, the measurements are taken on a development part (that is representative of production). In some illustrative examples, the measurements are taken on a production part to perform updates in situ. In some illustrative examples, the measurements are taken as part of an inspection sampling plan.

The illustrative examples use the CAM data to create an updated surface that composite layups on which part programming can be based to account for the changing surfaces. In some illustrative examples, the updated surface is for subsequent production parts. In some illustrative examples, the updated surface is used for the composite structure from which the CAM data was taken.

The illustrative examples may be utilized on materials that have compactions or relaxations. Compactions or relaxations may change ply thicknesses of a composite structure. In periodically compacting the composite plies during lay up of composite structure, the composite plies are periodically debulked. Debulking the composite plies may create a difference between an expected intermediate surface and an actual intermediate surface.

Differences between the expected intermediate surface and the actual intermediate surface may create overlaps and gaps in subsequent courses or tows as the composite placement machine does not have knowledge of the actual surface it is laying down upon to within a specific value. Updating intermediate surfaces in laying up a composite structure may reduce overlaps and gaps in composite ply placement.

Overlaps and gaps in placement may be reduced by knowing the surface thickness to within 0.010". In some illustrative examples, overlaps and gaps impact surface quality. In some illustrative examples, overlaps and gaps can cause inconsistencies in the composite structure. In some illustrative examples, overlaps and gaps may create wrinkles in the composite structure.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A machine that comprises:
a composite placement machine programmed with a tool path defining a laydown surface of a single build composite structure comprising a plurality of composite plies;
measuring equipment configured to produce a measurement of an intermediate surface of the composite structure defined by at least one of the composite plies, wherein an accuracy of the measurement of the intermediate surface is within a tolerance for the composite structure; and
a tool path generator configured to modify the tool path, the modified tool path corresponding to a modified laydown surface for the composite placement machine, wherein formation of the modified tool path depends upon whether a difference between the measurement of the intermediate surface and an expected measurement of the intermediate surface exceeds a threshold, and wherein the modified laydown surface matches the measurement of the intermediate surface;
wherein the composite placement machine is configured to continue laying down, based upon the modified tool path, the composite plies on the intermediate surface.

2. The machine of claim 1, wherein the accuracy of the measurement of the intermediate surface is at least within 0.001".

3. The machine of claim 1, wherein the measuring equipment comprises a laser tracker.

4. The machine of claim 1, further comprising compaction equipment configured to apply heat and pressure to the intermediate surface.

5. The machine of claim 1, wherein the intermediate surface is of a set of composite plies and wherein the measurement of the intermediate surface of the composite structure and the formation of the modified tool path is performed during layup of the composite structure.

6. A machine that comprises:
a composite placement machine;
a tool path generator and a model within a computer, wherein the model is for a single build composite structure that comprises a set of plies,
and wherein the tool path generator is in communication with the composite placement machine and is configured to:
cause the composite placement machine to lay up the set of plies such that the set of plies comprises a first outer ply;
form a modified tool path based upon a difference between a first set of measurements and expected measurements for the first outer ply if the difference exceeds a threshold, wherein the modified tool path matches the first set of measurements; and
cause the composite placement machine to continue to lay up the set of plies on a surface of the first outer ply based on the modified tool path;
measuring equipment configured to measure the surface of the first outer ply of the set of plies during formation of the composite structure to form the first set of measurements; and
compaction equipment configured to apply heat and/or pressure to the first outer ply.

7. The machine of claim 6, wherein the first set of measurements comprises a size and a shape of the first outer ply.

8. The machine of claim 6, wherein the measuring equipment comprises a laser tracker.

9. The machine of claim 6, wherein the measuring equipment comprises a laser tracker that comprises an accuracy of at least 0.001".

10. The machine of claim 6, wherein the compaction equipment is configured to apply the heat and the pressure to the first outer ply.

11. The machine of claim 6, wherein the set of plies comprises a quantity of plies between 10 and 20.

12. The machine of claim 6, wherein the model comprises the expected measurements for the first outer ply.

13. The machine of claim 6, wherein the model comprises: a ply geometry, a quantity of plies, an order of plies, and fiber orientations for the composite structure that comprises the set of plies.

14. A machine configured to form a single build composite structure that comprises composite plies, such that the machine comprises:
a composite placement machine configured to lay up the composite plies based on a tool path for the composite structure;
measuring equipment configured to measure a plurality of intermediate surfaces of the composite plies during the layup of the composite plies and form a plurality of measurements;
a computer that comprises a model for the composite structure and configured to control a tool path generator; and
the tool path generator configured to form a modified tool path for the composite placement machine in response to a difference between a set of measurements in the plurality of measurements and expected measurements of an intermediate surface of the plurality of intermediate surfaces that exceeds a threshold, wherein the modified tool path matches the set of measurements;
wherein the composite placement machine is further configured to continue laying up the composite plies on the intermediate surface of the plurality of intermediate surfaces based on the modified tool path.

15. The machine of claim 14, further comprising compaction equipment configured to apply at least one of: heat, and pressure, onto an intermediate surface of the plurality of intermediate surfaces of the composite plies.

16. The machine of claim 14, wherein the set of measurements comprises a size and a shape of a first set of the composite plies.

17. The machine of claim 14, further configured to form the structure to comprise dimensions within 0.001 inches of the model.

18. The machine of claim 14, wherein the measuring equipment comprises a laser tracker.

19. The machine of claim 14, wherein the composite placement machine comprises a placement head.

20. The machine of claim 14, wherein the measuring equipment is further configured to make the set of measurements of the plurality of intermediate surfaces with the composite plies located on a layup tool.

* * * * *